May 1, 1951 C. H. GEMBERLING 2,551,532
LOCKING DEVICE FOR IMPLEMENT ADJUSTMENT
Filed Oct. 2, 1947
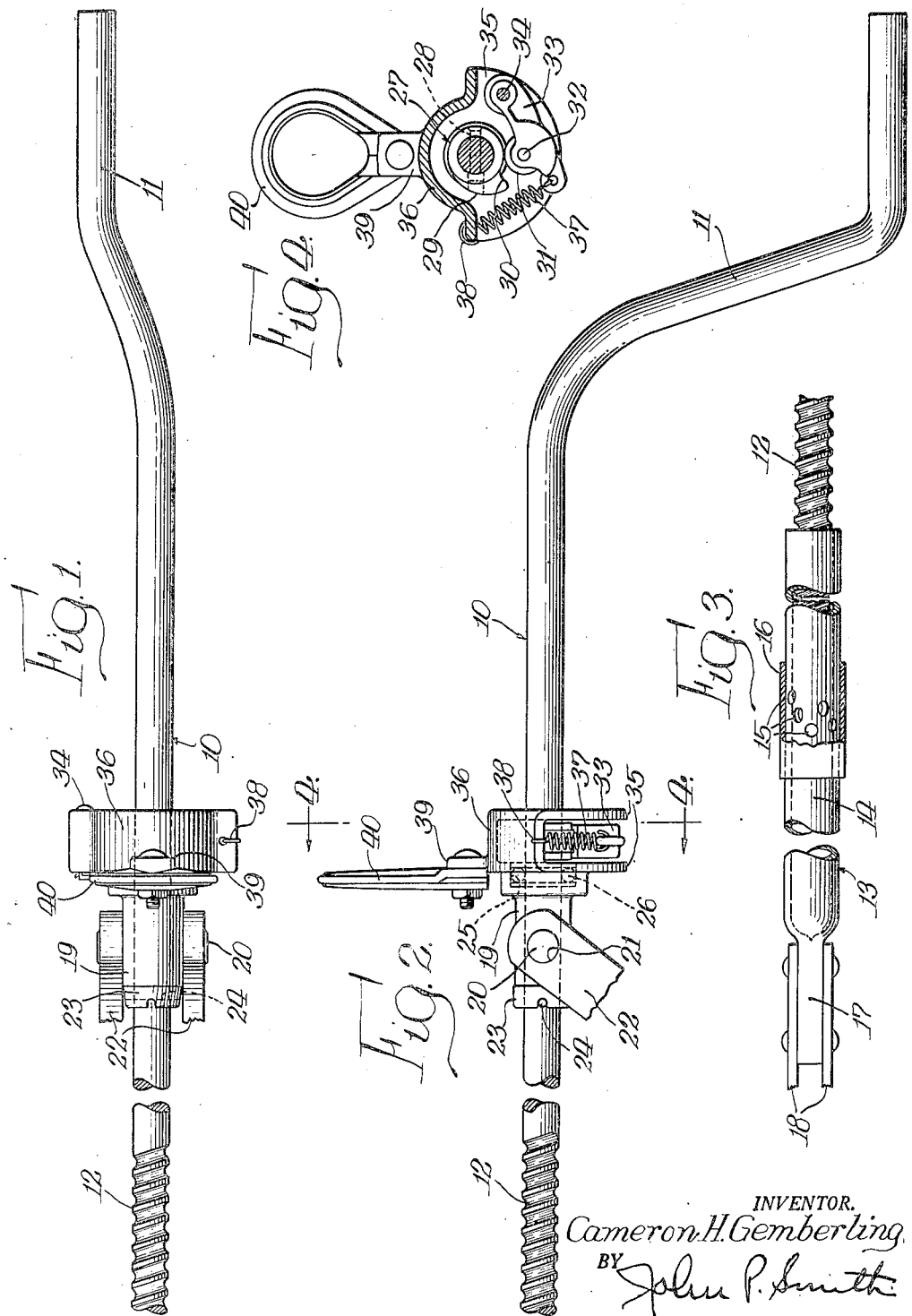
INVENTOR.
Cameron H. Gemberling
BY John P. Smith
Atty.

Patented May 1, 1951

2,551,532

UNITED STATES PATENT OFFICE 2,551,532

LOCKING DEVICE FOR IMPLEMENT ADJUSTMENT

Cameron H. Gemberling, South Bend, Ind., assignor to The Oliver Corporation, a corporation of Delaware Application October 2, 1947, Serial No. 777,569

4 Claims. (Cl. 74—528)

The present invention relates generally to a locking device for implement adjustment, but more particularly to a device for preventing the accidental displacement of previously adjusted implement parts usually caused by vibration of the implement.

Heretofore it has been the practice to prevent the crank end of a ball bearing screw adjusting device employed between the operative parts of an implement, to place a flat spring against one side of the rotatable member so as to offer resistance to the accidental rotation of the crank, but such an arrangement offers considerable resistance to the manual adjustment of the crank and does not always secure or produce satisfactory securing or locking means against accidental rotation.

It is, therefore, one of the objects of the present invention to not only overcome the disadvantages hereinabove pointed out, but to also provide sufficient resistance to the accidental rotation of the crank and at the same time aid, rather than resist, the normal manual adjustment of the crank, especially when the crank is operated to lift the load.

A further object of the invention is to provide a novel and improved locking arrangement or device, especially of the crank ball bearing screw type, for the adjustment of parts of an agricultural implement which offers sufficient resistance to the accidental rotation of the crank, but at the same time offers very little resistance to the manual adjustment of the same.

These and other objects are accomplished by providing a construction and an arrangement of the various parts in the manner hereinafter described and particularly pointed out in the appended claims.

Referring to the drawings:

Fig. 1 is a fragmentary top plan view of the conventional form of crank handle ball bearing screw adjustment having my improved locking means embodied therein;

Fig. 2 is a fragmentary side elevational view of the same;

Fig. 3 is a similar side elevational view of the adjustment mechanism; and

Fig. 4 is a cross sectional view taken on the line 4—4 in Fig. 2.

The present invention relates to a novel and improved lock for preventing the accidental rotation of the crank of a screw type connecting members used in connection with the adjustment of the operating parts of a plow or other farm implements. This novel lock has particular adaptation for the ball bearing screw type of adjustment which offers sufficient resistance by cam action to prevent the accidental rotation of the crank in one direction and therefore aids in the manual rotation of the crank in the other direction. At the same time the cam action is so arranged with respect to the rotation of the crank that little or no effort is required on the part of the operator to ride over the cam by the manipulation of the crank since there is no load to lift when the crank rod or screw is being actuated to make the necessary adjustment.

In illustrating one application of my invention, I have shown the same in connection with a more or less conventional form of adjusting device which includes an adjusting rod or crank, generally indicated by the reference character 10. This adjusting member 10 is provided with the usual crank handle 11 at one end and a round or curved screw thread 12 on the other end. Mounted in threaded engagement with the threaded end of the rod 10 is a complementary adjusting member, generally indicated by the reference character 13. This adjusting member comprises a pipe or tube 14, in the approximate center of which is a series of apertures 15 which are arranged in a spiral relation parallel to the grooves 12 of the threaded end of the rod. These apertures 15 are adapted to receive a plurality of conventional bearing balls therein for engagement with the threaded grooves 12 in the rod 10. The bearing balls in this instance are not shown. These balls are retained in position by a sleeve 16 which is welded or otherwise secured to the sleeve 13 to thereby form a ball bearing type of adjustment between the two co-operating members 10 and 13. The outer end of the pipe member 14 may be flattened as shown at 17, to which steel straps 18 may be riveted and form connections to any operating part, such as a crank of a plow or similar implement. The intermediate portion of the member 10 is journaled in a bearing 19. The bearing 19 has two oppositely aligned studs 20 which are pivoted in oppositely disposed aligned apertures 21 formed in two spaced apart supporting bars 22. The lower ends of the bar 22 are secured to and braced on the frame of the implement (not shown). The crank shaft 10 is held from displacement in one direction by a collar 23 which is secured to the rod 10 by a pin 24. The bearing 19 is provided on one end with an enlarged annular recess 25 in which is seated anti-friction or thrust ball bearing 26. Positioned against one side of the ball bearing 26 is one face of a cam member, generally indicated by the reference character 27. The cam member 27 is secured to the crank rod 10 by a transverse pin 28. The cam member 27 is provided with gradually increasing curved cam surface 29 and an abrupt curved surface or lug 30. The lug 30 acts as a resistor to the rotation of the crank in one direction and does not act as a positive stop. Cooperating with the cam member 27 and adapted to roll over the cam surfaces thereof is a roller 31 which is journaled on a pin or shaft 32 carried by the roller bracket 33. The roller bracket 33 is pivoted to a pin 34 supported in and secured to spaced apart arcuate flanges 35. The flanges 35 are formed integrally with the bearing member 19 and are connected together by an arcuate flange 36 which forms in effect a housing for encasing the cam and operating parts of the roller and bracket. The free end of the roller bracket 33 is connected by means of a spring 37 to one end of the housing 36 as shown at 38. The housing 36 is provided with an apertured ear 39 to which an eye 40 may be secured. The eye 40 may be used in connection with the rod or rope control for manipulation of the trip of the power lift mechanisms and the like.

Summarizing the function and advantages of operation of my improved locking device, it will be readily seen that by employing a crank operated member with a stop in the form of an abrupt cam surface in combination with a spring pressed roller to engage the cam, a very efficient lock is provided which will offer sufficient resistance to prevent the riding of this roller over the abrupt portion of the cam and thereby resist the accidental rotation of the crank member ordinarily caused by an excess of vibration of the implement in the field. At the same time the cam here employed will not offer any appreciable resistance to the normal manual rotation of the crank because when the crank is rotated in this direction, the load is not being lifted. Of course, it is obvious that when the rotation of the crank is in the other direction the roller rides over the gradually curved portion of the cam and no resistance, or practically none, is offered to its rotation.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. A locking device for an implement comprising a rotatable member, a bearing support in which said member is mounted, a cam secured to said member, said cam having gradually increasing cam surfaces terminating in an abrupt lug, and a spring actuated roller carried by said bearing support and engageable with said abrupt lug for frictionally resisting the rotation of said member in one direction to a greater degree than the rotation of said member in the other direction.

2. A locking device comprising two longitudinally adjustable members, one of said members being revolvable with respect to the other, a support for one of said members, a cam member carried by one of said first named members, a single gradually outwardly curved cam surface formed on said cam member and terminating in a single abrupt lug, and a spring actuated roller carried by said support and engageable with said cam and lug whereby the resistance offered to the complete rotation of one of said first named members in one direction is greater than it is in the other direction.

3. A locking device comprising two longitudinally adjustable members, one of said members being revolvable with respect to the other, a support for one of said members, a cam member carried by one of said first named members, a single gradually outwardly curved cam surface formed on said cam member and terminating in a single abrupt lug, a bracket pivotally connected to said support, a roller journaled in said bracket and engageable with said cam and lug, and a spring connected with said bracket for urging the roller into engagement with said cam, whereby the resistance offered to the rotation of one of said first named members is greater in one direction than in the other.

4. A locking device comprising two longitudinally extensible members connected together, one of said members being in threaded engagement with the other, a support on which one of said members is journaled, a cam member carried by one of said first named members having a gradually outwardly curved cam surface terminating in an abrupt stop, a bracket pivotally carried by said support, a roller journaled on one end of said bracket and adapted to engage the cam surface and stop for offering greater resistance to the rotation of one of said first named members in one direction or rotation than in the other.

CAMERON H. GEMBERLING.

REFERENCES CITED

The following references are of record in the file of this patent:

UNITED STATES PATENTS

| Number | Name | Date |
|---|---|---|
| 1,211,585 | Hooper | Jan. 9, 1917 |
| 1,249,755 | Holmgren | Dec. 11, 1917 |
| 1,509,943 | Farmer | Sept. 30, 1924 |
| 1,615,227 | Lehmann | Jan. 25, 1927 |
| 2,128,373 | Mekelburg | Aug. 30, 1938 |
| 2,169,049 | Hunter et al. | Aug. 8, 1939 |
| 2,197,284 | Wooster | Apr. 16, 1940 |